(12) United States Patent
Takarada et al.

(10) Patent No.: US 8,691,924 B2
(45) Date of Patent: Apr. 8, 2014

(54) OPTICAL-USE PRESSURE-SENSITIVE ADHESIVE SHEET

(75) Inventors: Shou Takarada, Ibaraki (JP); Takahiro Nonaka, Ibaraki (JP); Hiroaki Kishioka, Ibaraki (JP); Hiroaki Fumoto, Ibaraki (JP); Tomohide Banba, Ibaraki (JP); Masayuki Okamoto, Ibaraki (JP); Masahito Niwa, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 85 days.

(21) Appl. No.: 12/941,450

(22) Filed: Nov. 8, 2010

(65) Prior Publication Data

US 2011/0112249 A1   May 12, 2011

(30) Foreign Application Priority Data

Nov. 9, 2009 (JP) ................................. 2009-256249

(51) Int. Cl.
  *C08F 226/10* (2006.01)
  *C08F 220/28* (2006.01)
  *B32B 27/30* (2006.01)
  *C09J 4/02* (2006.01)
  *C08F 2/48* (2006.01)

(52) U.S. Cl.
  USPC ........ 526/264; 526/282; 526/304; 526/307.7; 526/318.42; 526/320; 526/931; 522/167; 428/522; 156/331.15

(58) Field of Classification Search
  USPC ........... 526/317.1, 931, 264, 282, 304, 307.7, 526/318.42, 320; 522/167; 156/331.5; 428/522
  See application file for complete search history.

(56) References Cited

U.S. PATENT DOCUMENTS

| | | | |
|---|---|---|---|
| 5,708,110 A * | 1/1998 | Bennett et al. | ............. 526/307.7 |
| 6,013,722 A * | 1/2000 | Yang et al. | .................... 524/558 |
| 6,299,975 B1 | 10/2001 | Takahira et al. | |
| 8,361,633 B2 | 1/2013 | Everaerts et al. | |
| 2009/0279030 A1 | 11/2009 | Toyama et al. | |
| 2009/0324944 A1 | 12/2009 | Toyama et al. | |
| 2010/0080991 A1 | 4/2010 | Kishioka et al. | |
| 2010/0086706 A1 | 4/2010 | Everaerts et al. | |
| 2012/0282479 A1 | 11/2012 | Everaerts et al. | |

FOREIGN PATENT DOCUMENTS

| | | |
|---|---|---|
| CN | 1284106 A | 2/2001 |
| CN | 102164745 A | 8/2011 |
| EP | 2 037 299 A1 | 3/2009 |
| EP | 2 169 024 A1 | 3/2010 |
| JP | 11-199832 A | 7/1999 |
| JP | 2003-238915 A | 8/2003 |
| JP | 2003-342542 A | 12/2003 |
| JP | 2004-231723 A | 8/2004 |
| JP | 2004-263084 A | 9/2004 |
| JP | 2008-255314 A | 10/2008 |
| JP | 4383531 B2 | 10/2009 |
| JP | 2012-504512 A | 2/2012 |
| WO | 2007/046202 A1 | 4/2007 |

OTHER PUBLICATIONS

Notification dated Jan. 23, 2012 issued in Japanese Application No. 2009-256249.
"Glass Transition Temperatures of Polymers", In: J. Brandrup, E.H. Immergut, E.A. Grulke: "Polymer Handbook", 1999, John Wile & Sons, Inc., New York, Chichester, Weinheim, Brisbane, Singapore, Toronto, XP002623675, p. VI/200, total 1 page.
Extended European Search Report issued in European application No. 10190412.6-2102 dated Mar. 23, 2011.
Office Action issued in corresponding application No. 2009-256249 dated Jun. 11, 2013
Communication dated Feb. 1, 2013 from the State Intellectual Property Office of P.R. China in counterpart application No. 201010543725.7.
Communication, dated Mar. 19, 2013, issued by the Japanese Patent Office in counterpart Japanese Patent Application No. 2009-256249.
Communication dated Oct. 30, 2013, issued by the State Intellectual Property Office of the People's Republic of China in corresponding Application No. 201010543725.7.

\* cited by examiner

*Primary Examiner* — Fred M Teskin
(74) *Attorney, Agent, or Firm* — Sughrue Mion, PLLC

(57) ABSTRACT

The present invention provides an optical-use pressure-sensitive adhesive sheet, which includes a pressure-sensitive adhesive layer containing a polymer formed of one or more monomer ingredients containing, as an indispensable monomer ingredient, a monomer of which homopolymer has a glass transition temperature of not lower than −10° C., said sheet having a moisture content of at least 0.65% by weight after stored in an environment at 60° C. and 95% RH for 120 hours. The pressure-sensitive adhesive layer is preferably an acrylic pressure-sensitive adhesive layer.

7 Claims, 1 Drawing Sheet

OPTICAL-USE PRESSURE-SENSITIVE ADHESIVE SHEET

FIELD OF THE INVENTION

The present invention relates to an optical-use pressure-sensitive adhesive sheet, which is used in attaching optical members or the like and in producing optical members, etc.

BACKGROUND OF THE INVENTION

Recently, display devices such as liquid-crystal displays (LCD), and input devices to be combined with the display devices such as touch panels have become widely used in various fields. In producing such display devices and input devices, transparent pressure-sensitive adhesive sheets (tapes) are used for attaching optical members. For example, for attaching a touch panel to the optical member (e.g., protective plate) of various display devices, a transparent pressure-sensitive adhesive sheet is used (for example, see JP-A-2003-238915, JP-A-2003-342542 and JP-A-2004-231723).

With the expansion of the applicability of those display devices and input devices, the pressure-sensitive adhesive sheet for use in such devices has become required to satisfy not only transparency but also the ability to fully show its potency as a pressure-sensitive adhesive sheet in various environments. For example, the pressure-sensitive adhesive sheet is required to satisfy adhesion reliability at high temperatures, for example, having excellent adhesiveness and resistance to foaming or peeling (foaming/peeling resistance) in high-temperature environments. In addition, the pressure-sensitive adhesive sheet is further required to satisfy the property (visibility and outward appearance retentivity) of not having any negative influence on the visibility and the outward appearance of the attached optical members and optical articles in various environments (for example, in high-temperature high-humidity environments).

As a pressure-sensitive adhesive sheet excellent in visibility and outward appearance retentivity, there is proposed a pressure-sensitive adhesive sheet not getting cloudy by humidification (see JP-A-2004-263084). However, though excellent in visibility and outward appearance, the pressure-sensitive adhesive sheet is problematic in that its adhesion reliability at high temperatures is poor, for example, its adhesion force lowers at high temperatures therefore causing foaming or peeling. Specifically, a pressure-sensitive adhesive sheet, which satisfies both visibility/outward appearance retentivity and high-temperature adhesion reliability, has not been obtained yet.

SUMMARY OF THE INVENTION

Accordingly, an object of the invention is to provide an optical-use pressure-sensitive adhesive sheet, which is excellent in visibility and outward appearance retentivity without getting cloudy by humidification, and which is also excellent in adhesion reliability at high temperatures. Furthermore, another object of the invention is to provide an optical-use pressure-sensitive adhesive sheet which is further excellent in corrosion resistance.

The inventors have assiduously studied and, as a result, have found that an optical-use pressure-sensitive adhesive sheet, which is so planned as to comprise a pressure-sensitive adhesive layer containing a polymer formed of a specific monomer ingredient and to have a moisture content falling within a specific range after stored in an environment at 60° C. and 95% RH for 120 hours, is excellent in adhesion reliability at high temperatures and does not get cloudy by humidification. The inventors have completed the present invention on the basis of these findings.

Namely, the present invention provides an optical-use pressure-sensitive adhesive sheet, which comprises a pressure-sensitive adhesive layer containing a polymer formed of one or more monomer ingredients containing, as an indispensable monomer ingredient, a monomer of which homopolymer has a glass transition temperature of not lower than −10° C., said sheet having a moisture of at least 0.65% by weight after stored in an environment at 60° C. and 95% RH for 120 hours.

In an embodiment, the polymer is an acrylic polymer and the pressure-sensitive adhesive layer is an acrylic pressure-sensitive adhesive layer.

In an embodiment, the optical-use pressure-sensitive adhesive sheet has a whole light transmittance of at least 87% and a haze of at most 3.0%.

In an embodiment, the optical-use pressure-sensitive adhesive sheet has a whole light transmittance of at least 87% and a haze of at most 3.5% after stored in an environment at 60° C. and 95% RH for 120 hours.

In an embodiment, the acrylic polymer is formed of monomer ingredients containing a carboxyl group-having monomer in an amount of less than 5% by weight relative to the total amount (100% by weight) of whole monomer ingredients for forming the acrylic polymer.

In an embodiment, the acrylic polymer is formed of monomer ingredients containing a hydrophilic monomer in an amount of from 3 to 70% by weight relative to the total amount (100% by weight) of whole monomer ingredients for forming the acrylic polymer.

The present invention also provides an optical member comprising the above-mentioned optical-use pressure-sensitive adhesive sheet.

The present invention also provides a touch panel comprising the above-mentioned optical-use pressure-sensitive adhesive sheet.

The present invention also provides an image display device comprising the above-mentioned optical-use pressure-sensitive adhesive sheet.

The present invention also provides an optical-use pressure-sensitive adhesive sheet, which does not get cloudy after stored in an environment at 60° C. and 95% RH for 120 hours.

Having the constitution as above, the optical-use pressure-sensitive adhesive sheet of the invention has excellent adhesion force at high temperatures and its floating or peeling from the adherend can be prevented or retarded. The pressure-sensitive adhesive sheet does not get cloudy under humidification conditions (especially under high-temperature high-humidity conditions). Accordingly, in case where the optical-use pressure-sensitive adhesive sheet of the invention is used in attaching optical members or the like or in production of optical articles or the like, it exhibits excellent adhesion reliability at high temperatures and does not detract from the visibility and the outward appearance of the attached optical members or optical articles.

DESCRIPTION OF REFERENCE NUMERALS

Figure 1:
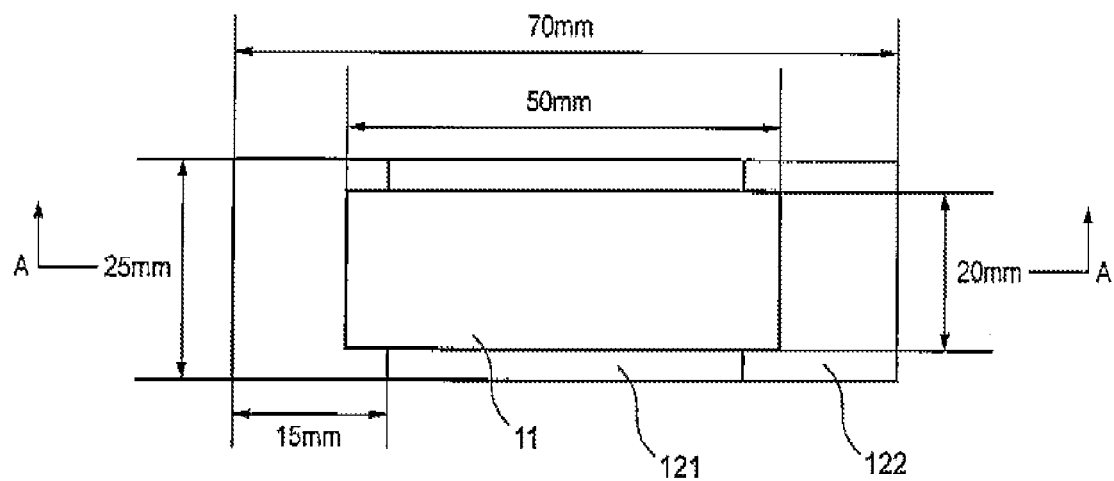
FIG. 1 is an outline view (plan view) showing a sample for resistance measurement, used in the corrosion resistance test in Examples.

11 Test Piece
111 PET Film

112 Double-sided Pressure-sensitive Adhesive Sheet
12 Electroconductive PET Film
121 Electroconductive PET Film (ITO film-coated side)
122 Electroconductive PET Film (silver paste-coated part)

DETAILED DESCRIPTION OF THE INVENTION

Embodiments of the invention are described in detail hereinunder.

The optical-use pressure-sensitive adhesive sheet of the invention (hereinafter this may be simply referred to as "pressure-sensitive adhesive sheet of the invention") includes a pressure-sensitive adhesive layer (hereinafter this may be referred to as "pressure-sensitive adhesive layer of the invention") which contains a polymer formed of one or more monomer ingredients containing, as indispensable monomer ingredient, a monomer of which homopolymer has a glass transition temperature (Tg) of not lower than −10° C., and the sheet has a moisture content of at least 0.65% by weight after stored in an environment at 60° C. and 95% RH for 120 hours.

The pressure-sensitive adhesive sheet of the invention may be a double-sided adhesive sheet of which the two faces are pressure-sensitive adhesive faces (pressure-sensitive adhesive layer surfaces), or a single-sided pressure-sensitive adhesive sheet of which one face alone is a pressure-sensitive adhesive face (pressure-sensitive adhesive layer surface). Above all, preferred is a double-sided pressure-sensitive adhesive sheet from the viewpoint of attaching two members to each other with it. In the invention, "pressure-sensitive adhesive sheet" includes a tape-like one, or that is, "pressure-sensitive adhesive tape".

The pressure-sensitive adhesive sheet of the invention may be a so-called "substrateless type" pressure-sensitive adhesive sheet having no substrate (substrate layer) (hereinafter this may be referred to as "substrateless pressure-sensitive adhesive sheet"), or a substrate-having type pressure-sensitive adhesive sheet. The substrateless pressure-sensitive adhesive sheet includes, for example, a double-sided pressure-sensitive adhesive sheet composed only of the pressure-sensitive adhesive layer of the invention, as well as a double-sided pressure-sensitive adhesive sheet including the pressure-sensitive adhesive layer of the invention and any other pressure-sensitive adhesive layer (this may be hereinafter referred to as "other pressure-sensitive adhesive layer") than the pressure-sensitive adhesive layer of the invention. It is sufficient for the substrate-having type pressure-sensitive adhesive tape to have the pressure-sensitive adhesive layer of the invention on at least one side of the substrate. Above all, from the viewpoint of reducing the thickness thereof and enhancing the optical properties such as the transparency thereof, preferred is the substrateless pressure-sensitive adhesive sheet (substrateless double-sided pressure-sensitive adhesive sheet), and more preferred is a substrateless double-sided pressure-sensitive adhesive sheet composed only of the pressure-sensitive adhesive layer of the invention. The above-mentioned "substrate (substrate layer)" does not include a separator (release liner) to be released before using (attaching) the pressure-sensitive adhesive sheet.

Pressure-sensitive Adhesive Layer of the Invention

The pressure-sensitive adhesive layer of the invention contains, as the main component thereof, a polymer formed of one or more monomer ingredients containing, as an indispensable monomer ingredient, a monomer of which homopolymer has a glass transition temperature of not lower than −10° C. (this monomer may be referred to as "monomer whose homopolymer has Tg of not lower than −10° C.").

The polymer serving as the main component of the pressure-sensitive adhesive layer of the invention is not specifically defined so far as its indispensable monomer ingredient is the above-mentioned monomer whose homopolymer has Tg of not lower than −10° C.; and acrylic polymers, polyether polymers, silicone polymers and the like are usable here. Of those, preferred are acrylic polymers. Specifically, the pressure-sensitive adhesive layer of the invention is preferably an acrylic pressure-sensitive adhesive layer comprising an acrylic polymer as the main component thereof. The content of the acrylic polymer in the acrylic pressure-sensitive adhesive layer (100% by weight) is preferably at least 65% by weight (for example, from 65 to 100% by weight), more preferably from 70 to 99.999% by weight from the viewpoint of the adhesion property of the sheet at high temperatures and of the outward appearance thereof under high-temperature high-humidity conditions.

Not specifically defined as varying depending on its formation method, the acrylic pressure-sensitive adhesive layer may be formed of an acrylic pressure-sensitive adhesive composition that comprises an acrylic polymer as the indispensable component thereof, or of an acrylic pressure-sensitive adhesive composition that comprises, as the indispensable component thereof, a monomer mixture of forming an acrylic polymer (hereinafter this may be referred to as "monomer mixture") or its prepolymer. Not specifically defined, the former includes, for example, a so-called solvent-based pressure-sensitive adhesive composition, and the latter includes, for example, an active energy-curable pressure-sensitive adhesive composition. The pressure-sensitive adhesive composition may contain, if desired, a crosslinking agent and other various additives.

The term "pressure-sensitive adhesive composition" implies a sense of "composition for forming a pressure-sensitive adhesive layer". The term "monomer mixture" means a mixture consisting of monomer ingredients for forming an acrylic polymer. The term "prepolymer" means a composition in which one or more of the constitutive ingredients of the monomer mixture are partly polymerized.

The acrylic polymer is formed (composed) of one or more monomer ingredients including an acrylic monomer (including (meth)acrylic acid and (meth)acrylic acid derivatives) as the indispensable monomer ingredient (monomer component), in which the indispensable monomer ingredient is a monomer whose homopolymer has Tg of not lower than −10° C. Preferably, the monomer ingredients for forming the acrylic polymer contains a hydrophilic monomer that is mentioned below. The above-mentioned term "(meth)acryl" means "acryl" and/or "methacryl", and the same shall apply to those in the present specification.

As described in the above, the acrylic polymer is a polymer formed by using an acrylic monomer as the indispensable monomer ingredient thereof. Not specifically defined but concretely, the acrylic polymer is preferably a polymer formed of monomer ingredients including a linear or branched alkyl group-having alkyl (meth)acrylate and/or alkoxyalkyl (meth)acrylate as the main monomer ingredient and a polar group-having monomer as the comonomer ingredient thereof. Optionally, the monomer ingredients for forming the polymer may further contain a polyfunctional monomer and any other comonomer as the comonomer ingredient thereof.

Examples of the linear or branched alkyl group-having alkyl (meth)acrylate (hereinafter this may be simply referred to as "alkyl (meth)acrylate") include alkyl (meth)acrylates in which the alkyl group has from 1 to 20 carbon atoms, such as methyl (meth)acrylate, ethyl (meth)acrylate, propyl (meth)

acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. Of those, preferred are alkyl (meth)acrylates where the alkyl group has from 3 to 14 carbon atoms; more preferred are alkyl (meth)acrylates where the alkyl group has from 3 to 10 carbon atoms; even more preferred are alkyl (meth)acrylates where the alkyl group has from 4 to 8 carbon atoms; still more preferred are 2-ethylhexyl acrylate (2EHA) and n-butyl acrylate (BA). One or more such alkyl (meth)acrylates may be used here either singly or as combined.

As the alkoxyalkyl (meth)acrylate, an alkoxyalkyl acrylate is preferably used. Not specifically defined, examples of the alkoxyalkyl (meth)acrylate include 2-methoxyethyl (meth)acrylate, 2-ethoxyethyl(meth)acrylate, methoxytriethylene glycol (meth)acrylate, 3-methoxypropyl (meth)acrylate, 3-ethoxypropyl (meth)acrylate, 4-methoxybutyl (meth)acrylate, 4-ethoxybutyl (meth)acrylate, etc. Above all, preferred is 2-methoxyethyl acrylate (2MEA). One or more such alkoxyalkyl (meth)acrylates may be used here either singly or as combined.

The content of the alkyl (meth)acrylate and/or alkoxyalkyl (meth)acrylate is, from the viewpoint of the low-temperature adhesiveness of the pressure-sensitive adhesive layer, preferably at least 30% by weight (for example, from 30 to 99% by weight), more preferably from 50 to 99% by weight, even more preferably from 50 to 95% by weight, relative to the total amount (100% by weight) of whole monomer ingredients for forming the pressure-sensitive acrylic polymer. In case where both alkyl (meth)acrylate and alkoxyalkyl (meth)acrylate are used as the monomer ingredients, it is enough that the total (total content) of the content of the alkyl (meth)acrylate and the content of the alkoxyalkyl (meth)acrylate satisfy the above range.

In case where both alkyl (meth)acrylate and alkoxyalkyl (meth)acrylate are used as the monomer ingredients for forming the acrylic polymer, the content of the alkoxyalkyl (meth)acrylate relative to the total content (100% by weight) of the two is preferably from 1 to 50% by weight, more preferably from 1 to 40% by weight.

Examples of the above-mentioned polar group-having monomer include hydroxyl group-having monomers such as hydroxyalkyl (meth)acrylates, e.g., 2-hydroxyethyl (meth)acrylate, 3-hydroxypropyl (meth)acrylate, 4-hydroxybutyl (meth)acrylate, 6-hydroxyhexyl (meth)acrylate, etc., vinyl alcohol, allyl alcohol, etc.; amide group-having monomers such as (meth)acrylamide, N,N-dimethyl (meth)acrylamide, N-methylol(meth)acrylamide, N-methoxymethyl(meth)acrylamide, N-butoxymethyl(meth)acrylamide, N-hydroxyethyl(meth)acrylamide, etc.; amino group-having monomers such as aminoethyl (meth)acrylate, dimethylaminoethyl (meth)acrylate, t-butylaminoethyl (meth)acrylate, etc.; epoxy group-having monomers such as glycidyl (meth)acrylate, methylglycidyl (meth)acrylate, etc.; cyano group-having monomers such as acrylonitrile, methacrylonitrile, etc.; hetero ring-having vinyl monomers such as N-vinyl-2-pyrrolidone, (meth)acryloylmorpholine, N-vinylpyridine, N-vinylpiperidone, N-vinylpyrimidine, N-vinylpiperazine, N-vinylpyrrole, N-vinylimidazole, N-vinyloxazole, etc.; sulfonic acid group-having monomers such as sodium vinylsulfonate, etc.; phosphoric acid group-having monomers such as 2-hydroxyethyl acryloylphosphate, etc.; imide group-having monomers such as cyclohexylmaleimide, isopropylmaleimide, etc.; isocyanate group-having monomers such as 2-methacryloyloxyethyl isocyanate, etc.

Examples of the polyfunctional monomer include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, etc. Of the above, use of dipentaerythritol hexaacrylate is preferred from the viewpoint of the high-temperature adhesiveness of the pressure-sensitive adhesive layer. One or more such polyfunctional monomers may be used here either singly or as combined.

The content of the polyfunctional monomer may be at most 0.5% by weight (for example, from 0 to 0.5% by weight), preferably from 0 to 0.1% by weight, relative to the total amount (100% by weight) of whole monomer ingredients for forming the acrylic polymer. When the content is more than 0.5% by weight, the cohesive force of the acrylic pressure-sensitive adhesive layer may be too high and the adhesiveness thereof may lower. In case where a crosslinking agent is used, the polyfunctional monomer may not be used; but when a crosslinking agent is not used, the content of the polyfunctional monomer is preferably from 0.001 to 0.5% by weight, more preferably from 0.002 to 0.1% by weight.

As the copolymerizable monomer (other copolymerizable monomer) other than the polar group-having monomer and the polyfunctional monomer, there may be mentioned, for example, (meth)acrylates other than the above-mentioned alkyl (meth)acrylates, alkoxyalkyl (meth)acrylates, polar group-having monomers and polyfunctional monomers, such as alicyclic hydrocarbon group-having (meth)acrylates, e.g., cyclopentyl (meth)acrylate, cyclohexyl (meth)acrylate, isobornyl (meth)acrylate, etc., and aromatic hydrocarbon group-having (meth)acrylates, e.g., phenyl (meth)acrylate, phenoxyethyl (meth)acrylate, benzyl (meth)acrylate, etc.; vinyl esters such as vinyl acetate, vinyl propionate, etc.; aromatic vinyl compounds such as styrene, vinyltoluene, etc.; olefins or dienes such as ethylene, butadiene, isoprene, isobutylene, etc.; vinyl ethers such as vinyl alkyl ether, etc.; vinyl chloride, etc.

Among the acrylic polymers formed of the above-mentioned monomer ingredients, the acrylic polymer which constitutes the pressure-sensitive adhesive layer of the invention must be formed by using as the indispensable monomer ingredient a monomer whose homopolymer has Tg of not lower than −10° C. The monomer whose homopolymer has Tg of not lower than −10° C. may be suitably selected from the above-mentioned monomers (alkyl (meth)acrylates, alkoxyalkyl (meth)acrylates, polar group-having monomers, polyfunctional monomers and other comonomers).

The monomer whose homopolymer has Tg of not lower than −10° C. means that, when it is formed into a homopolymer, the glass transition temperature (Tg) of the homopolymer is not lower than −10° C. (for example, from −10 to 250° C.), but is preferably from −10 to 230° C., more preferably from −10 to 200° C. The monomer whose homopolymer has Tg of lower than −10° C. cannot exhibit excellent adhesion force at high temperatures and may have some negative influence on the foaming/peeling resistance of the pressure-sensitive adhesive layer. The monomer whose homopolymer has Tg of higher than 250° C. may too much harden the pressure-sensitive adhesive layer and the adhesiveness of the layer may sometimes be lowered.

The "glass transition temperature (Tg) which the homopolymer formed of the monomer has" as referred to in the invention (hereinafter this may be simply referred to as "glass transition temperature (Tg) of the homopolymer") means the "glass transition temperature (Tg) of the homopolymer formed of the monomer", and the data are concretely shown in "Polymer Handbook" (3rd Ed., by John Wile & Sons, Inc., 1987). Tg of the homopolymer of the monomer not shown in this reference may be the value to be determined according to the measurement method mentioned below (see JP-A-2007-51271). Briefly, 100 parts by weight of a monomer, 0.2 parts by weight of 2,2'-azobisisobutyronitrile and 200 parts by weight of ethyl acetate as a polymerization solvent are put into a reactor equipped with a thermometer, a stirrer, a nitrogen-introducing duct and a reflux condenser tube, and stirred for 1 hour with introducing nitrogen gas thereinto. Oxygen is removed from the polymerization system in that manner, then this is heated up to 63° C. and reacted from 10 hours. Next, this is cooled to room temperature to give a homopolymer solution having a solid concentration of 33% by weight. Next, the homopolymer solution is cast onto a separator and dried to prepare a test sample having a thickness of about 2 mm (sheet-like homopolymer). The test sample is blanked into a disc having a diameter of 7.9 mm, and sandwiched between parallel plates, and its viscoelasticity is measured using a viscoelasticity tester (ARES, by Rheometrics) with a shear strain of frequency 1 Hz given thereto, in a shear mode within a temperature range of from –70 to 150° C. at a heating speed of 5° C./min, and the peak top temperature at tan δ is regarded as Tg of the homopolymer.

The monomer of which Tg of the homopolymer is not lower than –10° C. is not specifically defined so far at its homopolymer has Tg of not lower than –10° C., and may be suitably selected from ordinary known vinyl monomers (monoethylene unsaturated monomers). Specific examples of the monomer whose homopolymer has Tg of not lower than –10° C. include isobornyl (meth)acrylate, N-vinyl-2-pyrrolidone, N-hydroxyethyl(meth)acrylamide, etc. Of those, preferred is use of isobornyl acrylate (IBXA) (Tg of its homopolymer, 94° C.), N-vinyl-2-pyrrolidone (NVP) (Tg of its homopolymer, 54° C.) or N-hydroxyethylacrylamide (HEAA) (Tg of its homopolymer, 98° C.). In particular, N-vinyl-2-pyrrolidone are N-hydroxyethylacrylamide are highly hydrophilic and can be used as a hydrophilic monomer to be mentioned below. Use of the monomer is preferred as enhancing the foaming/peeling resistance of the pressure-sensitive adhesive layer and also efficiently regulating the moisture content of the pressure-sensitive adhesive sheet to be mentioned below. One or more such monomers of which Tg of the homopolymer is not lower than –10° C. may be used herein either singly or as combined.

The content of the monomer of which Tg of the homopolymer is not lower than –10° C. relative to the whole monomer ingredients (total amount of monomer ingredients) (100% by weight) constituting the acrylic polymer is not specifically defined, but is preferably at least 5% by weight (for example, from 5 to 60% by weight), more preferably from 5 to 50% by weight, even more preferably from 5 to 40% by weight, still more preferably from 8 to 40% by weight, further preferably from 15 to 40% by weight. In case where the content of the monomer of which Tg of the homopolymer is not lower than –10° C. is less than 5% by weight, then the pressure-sensitive adhesive layer cannot exhibit excellent adhesion force or may be readily foamed and peeled in some cases. On the other hand, when the content is more than 60% by weight, then the acrylic pressure-sensitive adhesive layer may be too hard and its adhesiveness may lower in some cases. In case where two or more different types of monomers of which the homopolymers each have Tg of not lower than –10° C. are used in combination, then it is enough that the total content of the monomers of which the homopolymers each have Tg of not lower than –10° C. satisfies the above range.

The acrylic polymer is preferably a copolymer formed by using a hydrophilic monomer as a copolymerizable monomer. Not specifically defined, the hydrophilic monomer may be any one having high affinity to water, and may be generally selected from the above-mentioned polar group-having monomers. Use of the hydrophilic monomer as a copolymerizable monomer may bring about the advantage of easy regulation of the moisture content of the pressure-sensitive adhesive sheet of the invention to fall within a specific range when stored in an environment at 60° C. and 95% RH for 120 hours.

Not specifically defined, examples of the hydrophilic monomer include hydroxyl group-having monomers such as hydroxyalkyl (meth)acrylates, e.g., 2-hydroxyethyl (meth)acrylate, 3-hydroxypropyl (meth)acrylate, 4-hydroxybutyl (meth)acrylate, 6-hydroxyhexyl (meth)acrylate, etc., vinyl alcohol, allyl alcohol, etc.; amide group-having monomers such as (meth)acrylamide, N,N-dimethyl (meth)acrylamide, N-methylol(meth)acrylamide, N-methoxymethyl(meth)acrylamide, N-butoxymethyl(meth)acrylamide, N-hydroxyethyl(meth)acrylamide, etc.; amino group-having monomers such as aminoethyl (meth)acrylate, dimethylaminoethyl (meth)acrylate, t-butylaminoethyl (meth)acrylate, etc.; epoxy group-having monomers such as glycidyl (meth)acrylate, methylglycidyl (meth)acrylate, etc.; cyano group-having monomers such as acrylonitrile, methacrylonitrile, etc.; hetero ring-having vinyl monomers such as N-vinyl-2-pyrrolidone, (meth)acryloylmorpholine, N-vinylpyridine, N-vinylpiperidone, N-vinylpyrimidine, N-vinylpiperazine, N-vinylpyrrole, N-vinylimidazole, N-vinyloxazole, etc.; sulfonic acid group-having monomers such as sodium vinylsulfonate, etc.; phosphoric acid group-having monomers such as 2-hydroxyethyl acryloylphosphate, etc.; imide group-having monomers such as cyclohexylmaleimide, isopropylmaleimide, etc.; isocyanate group-having monomers such as 2-methacryloyloxyethyl isocyanate, etc. Of the above, preferred are hetero ring-having vinyl monomers, amide group-having monomers and hydroxyl group-having monomers from the viewpoint of moisture content control; and more preferred are N-vinyl-2-pyrrolidone (NVP), N-hydroxyethylacrylamide (HEAA) and 2-hydroxyethyl acrylate (HEA). One or more such hydrophilic monomers may be used here either singly or as combined.

Of the above-mentioned hydrophilic monomers, those of which the homopolymers have Tg of not lower than –10° C. may be used here as "monomer of which Tg of the homopolymer is not lower than –10° C.". Examples of such monomers include N-vinyl-2-pyrrolidone (NVP), N-hydroxyethylacrylamide (FAA), etc.

The content of the hydrophilic monomer is not specifically defined, but may be suitably determined in accordance with the type and the property of the hydrophilic monomer. For example, the content is preferably from 3 to 70% by weight, more preferably from 3 to 60% by weight, even more preferably from 5 to 40% by weight, still more preferably from 10 to 40% by weight, further preferably from 15 to 40% by weight, relative to the total amount (100% by weight) of whole monomer ingredients for forming the acrylic polymer.

When the content of the hydrophilic monomer is less than 3% by weight, then the moisture content of the pressure-sensitive adhesive sheet after stored in an environment at 60° C. and 95% RH for 120 hours may not be well controlled, or the outward appearance of the layer under high humidity may worsen in some cases. On the other band, when the content is more than 70% by weight, then the adhesion force of the layer may lower under high humidity in some cases. In case where two or more such hydrophilic monomers are used here, it is sufficient that the total content of the hydrophilic monomers satisfies the above range.

In case where the monomer of which Tg of the homopolymer is not lower than −10° C. is selected from the above-mentioned hydrophilic monomers and used here, it is sufficient that the content of the hydrophilic monomer that is taken as the monomer of which Tg of the homopolymer is not lower than −10° C. satisfies the above range.

In order that the pressure-sensitive adhesive sheet of the invention can exhibit corrosion resistance to metal thin films or the like, the content of the carboxyl group-having monomer in the monomer ingredients for forming the acrylic polymer is preferably controlled to be not higher than a predetermined level. Concretely, for example, the content of the carboxyl group-having monomer is preferably less than 5% by weight, more preferably at most 2% by weight (for example, from 0 to 2% by weight), even more preferably at most 0.5% by weight (for example, from 0 to 0.5% by weight), relative to the total content (100% by weight) of whole monomer ingredients for forming the acrylic polymer. In case where the content of the carboxyl group-having monomer is 5% by weight or more, and for example, when a metal thin film or a metal oxide thin film is directly attached to the pressure-sensitive adhesive sheet, then the metal thin film or the metal oxide thin film may be corroded in a high-temperature or high-humidity environment and the resistance value of the thin film may increase in some cases. Examples of the carboxyl group-having monomer include (meth)acrylic acid, itaconic acid, maleic acid, fumaric acid, crotonic acid and isocrotonic acid. Anhydrides of these carboxyl group-having monomers (e.g., acid anhydride-having monomers such as maleic anhydride, itaconic anhydride) are also included in the scope of the carboxyl group-having monomer.

The acrylic polymer may be produced through polymerization of the above-mentioned monomer ingredients according to an ordinary known polymerization method. The polymerization method for the acrylic polymer includes, for example, a solution polymerization method, an emulsion polymerization method, a bulk polymerization method, an active energy ray-irradiation polymerization method (active energy ray polymerization method), etc. Of those, preferred are a solution polymerization method and an active energy ray polymerization method from the viewpoint of the transparency, the waterproofness and the cost of the polymer.

The active energy rays to be radiated in the above active energy ray polymerization (photopolymerization) include, for example, ionizing radiations such as α rays, β rays, γ rays, neutron rays, electron beams, etc.; UV rays, etc. Especially preferred are UV rays. The radiation energy, the radiation time and the radiation method for active energy rays are not specifically defined so far as the radiated rays could activate the photopolymerization initiator used to thereby initiate the reaction of the monomer ingredients.

In the solution polymerization, various ordinary solvents may be used. Examples of the solvent include organic solvents, for example, esters such as ethyl acetate, n-butyl acetate, etc.; aromatic hydrocarbons such as toluene, benzene, etc.; aliphatic hydrocarbons such as n-hexane, n-heptane, etc.; alicyclic hydrocarbons such as cyclohexane, methylcyclohexane, etc.; ketones such as methyl ethyl ketone, methyl isobutyl ketone, etc. One or more such solvents may be used here either singly or as combined.

In producing the acrylic polymer, a polymerization initiator such as a photopolymerization initiator (optical initiator), a thermal polymerization initiator or the like may be used. One or more such polymerization initiators may be used here either singly or as combined.

Not specifically defined, examples of the photopolymerization initiator include benzoin ether photopolymerization initiators, acetophenone photopolymerization initiators, α-ketol photopolymerization initiators, aromatic sulfonyl chloride photopolymerization initiators, optical-active oxime photopolymerization initiators, benzoin photopolymerization initiators, benzyl photopolymerization initiators, benzophenone photopolymerization initiators, ketal photopolymerization initiators, thioxanthone photopolymerization initiators, etc. Not specifically defined, the amount of the photopolymerization initiator to be used is preferably from 0.01 to 0.2 parts by weight, more preferably from 0.05 to 0.15 parts by weight, relative to the total amount (100 parts by weight) of whole monomer ingredients for forming the acrylic polymer.

Examples of the benzoin ether photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one, anisole methyl ether, etc. Examples of the acetophenone photopolymerization initiator include 2,2-diethoxyacetophenone, 2,2-dimethoxy-2-phenylacetophenone, 1-hydroxycyclohexylphenylacetophenone, 4-phenoxydichloroacetophenone, 4-(t-butyl)dichloroacetophenone, etc. Examples of the α-ketol photopolymerization initiator include 2-methyl-2-hydroxypropiophenone, 1-[4-(2-hydroxyethyl)phenyl]-2-methylpropan-1-one, etc. Examples of the aromatic sulfonyl chloride photopolymerization initiator include 2-naphthalenesulfonyl chloride, etc. Examples of the optical-active oxime photopolymerization initiator include 1-phenyl-1,1-propanedione-2-(o-ethoxycarbonyl)-oxime, etc. Examples of the benzoin photopolymerization initiator include benzoin, etc. Examples of the benzyl photopolymerization initiator include benzyl, etc. Examples of the benzophenone photopolymerization initiator include benzophenone, benzoylbenzoic acid, 3,3'-dimethyl-4-methoxybenzophenone, polyvinylbenzophenone, α-hydroxycyclohexyl phenyl ketone, etc. Examples of the ketal photopolymerization initiator include benzyl dimethyl ketal, etc. Examples of the thioxanthone photopolymerization initiator include thioxanthone, 2-chlorothioxanthone, 2-methylthioxanthone, 2,4-dimethylthioxanthone, isopropylthioxanthone, 2,4-diisopropylthioxanthone, dodecylthioxanthone, etc.

Examples of the polymerization initiator to be used in producing the acrylic polymer through solution polymerization include azo initiators, peroxide polymerization initiators (e.g., dibenzoyl peroxide, tert-butyl permaleate, etc.), redox polymerization initiators, etc. Above all, preferred are the azo initiators described in JP-A-2002-69411. These azo initiators are preferred since the decomposate of the initiator hardly remains in the acrylic polymer as a part to cause outgassing under heat. Examples of the azo initiator include 2,2'-azobisisobutyronitrile (hereinafter this may be abbreviated as AIBN), 2,2'-azobis-2-methylbutyronitrile (hereinafter this may be abbreviated as AMBN), dimethyl 2,2'-azobis(2-methylpropionate), 4,4'-azobis-4-cyanovalerianic acid, etc. The amount of the azo initiator to be used is preferably from 0.05 to 0.5 parts by weight, more preferably from 0.1 to 0.3 parts by weight, relative to the total amount (100 parts by weight) of whole monomer ingredients for forming the acrylic polymer.

As especially preferred concrete constitution of the polymer, as the main component of the pressure-sensitive adhesive layer of the invention, the following acrylic polymers (1) and (2) may be mentioned. However, the invention should not be limited to these. As the polymerization method for these acrylic polymers, a solution polymerization method or an active energy ray polymerization method (in particular, UV polymerization method) is especially preferably used.

(1) An acrylic polymer formed of monomer ingredients including from 50 to 70% by weight of 2EHA, from 15 to 35% by weight of IBXA, and from 15 to 35% by weight of HEA.

(2) An acrylic polymer formed of monomer ingredients including from 60 to 80% by weight of 2EHA, from 8 to 15% by weight of 2MEA, from 5 to 15% by weight of NVP, from 1 to 10% by weight of HEAA, and from 3 to 20% by weight of HEA.

The pressure-sensitive adhesive composition for forming the pressure-sensitive adhesive layer of the invention (for example, the above-mentioned acrylic pressure-sensitive adhesive composition) may optionally contain, if desired, known additives such as crosslinking agents, crosslinking promoters, tackifiers (e.g., rosin derivatives, polyterpene resins, petroleum resins, oil-soluble phenols, etc.), aging inhibitors, fillers, colorants (pigments, dyes, etc.), UV absorbers, antioxidants, chain transfer agents, plasticizers, softeners, surfactants, and antistatic agents in the range where the characteristics of the invention are not impaired. Moreover, in formation of the pressure-sensitive adhesive layer of the invention, various ordinary solvents can be also used. The type of the solvent is not particularly limited and those exemplified as the solvent to be used in the above-mentioned solution polymerization can be used.

The crosslinking agent acts to crosslink the polymer to be the main component of the pressure-sensitive adhesive layer of the invention (base polymer, e.g., acrylic polymer) to thereby control the gel fraction in the pressure-sensitive adhesive layer. Examples of the crosslinking agent include an isocyanate crosslinking agent, an epoxy crosslinking agent, a melamine crosslinking agent, a peroxide crosslinking agent, an urea crosslinking agent, a metal alkoxide crosslinking agent, a metal chelate crosslinking agent, a metal salt crosslinking agent, a carbodiimide crosslinking agent, an oxazoline crosslinking agent, an aziridine crosslinking agent, an amine crosslinking agent, etc. Preferred are an isocyanate crosslinking agent and an epoxy crosslinking agent. One or more such crosslinking agents may be used here either singly or as combined.

Examples of the isocyanate crosslinking agent (polyfunctional isocyanate compound) include lower aliphatic polyisocyanates such as 1,2-ethylene diisocyanate, 1,4-butylene diisocyanate, 1,6-hexamethylene diisocyanate, etc.; alicyclic polyisocyanates such as cyclopentylene diisocyanate, cyclohexylene diisocyanate, isophorone diisocyanate, hydrogenated tolylene diisocyanate, hydrogenated xylylene diisocyanate, etc.; aromatic polyisocyanates such as 2,4-tolylene diisocyanate, 2,6-tolylene diisocyanate, 4,4'-diphenylmethane diisocyanate, xylylene diisocyanate, etc. In addition, also usable are trimethylolpropane/tolylene diisocyanate adduct [Nippon Polyurethane Industry's trade name, "Coronate L"], trimethylolpropane/hexamethylene diisocyanate adduct [Nippon Polyurethane Industry's trade name, "Coronate HL"], etc.

Examples of the epoxy crosslinking agent (polyfunctional epoxy compound) include N,N,N',N'-tetraglycidyl-m-xylylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, diglycidyl adipate, diglycidyl o-phthalate, triglycidyl tris(2-hydroxyethyl)isocyanurate, resorcin diglycidyl ether, bisphenol S diglycidyl ether, as well as epoxy resins having at least two epoxy groups in the molecule, etc. As a commercial product, for example, herein usable is Mitsubishi Gas Chemical's trade name, "Tetrad C".

Not specifically defined, the amount of the crosslinking agent in the pressure-sensitive adhesive composition is, for example, in case where the pressure-sensitive adhesive layer of the invention is an acrylic pressure-sensitive adhesive layer, preferably from 0.01 to 1 part by weight, more preferably from 0.01 to 0.8 parts by weight, relative to the total amount (100 parts by weight) of whole monomer ingredients for forming the acrylic polymer.

Not specifically defined, the thickness of the pressure-sensitive adhesive layer of the invention is preferably from 10 to 500 μm, more preferably from 10 to 250 μm, even more preferably from 10 to 200 μm. In case where the thickness of the pressure-sensitive adhesive layer is more than 500 μm, then the sheet may shrink when wound up after coated with the layer, or may get cloudy by humidification in some cases. In case where the thickness of the pressure-sensitive adhesive layer is less than 10 μm, then the pressure-sensitive adhesive layer is too thin and therefore may fail in stress dispersion therein, and if so, the layer may readily peel off in some cases.

The haze (according to JIS K 7136) of the pressure-sensitive adhesive layer of the invention is, for example, preferably at most 3.0%, more preferably at most 1.5%. In case where the haze is more than 3.0%, then the transparency and the outward appearance of the optical articles and the optical members with the pressure-sensitive adhesive sheet of the invention attached thereto may worsen in some cases. The haze may be measured, for example, by attaching the pressure-sensitive adhesive sheet of the invention to a slide glass (for example, having a whole light transmittance of 91.8% and a haze of 0.4%) and analyzing it with a haze meter (Murakami Color Search Laboratory's trade name "HM-150").

The haze of the pressure-sensitive adhesive layer of the invention after stored (immediately after stored) in an environment at 60° C. and 95% RH for 120 hours (the haze after stored in an environment at 60° C. and 95% RH for 120 hours may be hereinafter referred to as "haze (immediately after stored under wet heat)" is, for example, preferably at most 3.5%, more preferably at most 2.5%. When the haze (immediately after stored under wet heat) is more than 3.5%, then the visibility and the outward appearance retentivity of the products and the optical members with the pressure-sensitive adhesive sheet of the invention attached thereto may worsen in some cases.

The haze of the pressure-sensitive adhesive layer of the invention after stored in an environment at 60° C. and 95% RH for 120 hours and then stored in an environment at 23° C. and 50% RH for 2 hours (the haze may be hereinafter referred to as "haze (in 2 hours after stored under wet heat)" is, for example, preferably at most 3.0%, more preferably at most 2.5%. When the haze (in 2 hours after stored under wet heat)

is more than 3.0%, then the visibility and the outward appearance retentivity of the products and the optical members with the pressure-sensitive adhesive sheet of the invention attached thereto may worsen in some cases.

For forming the pressure-sensitive adhesive layer of the invention, any known or conventional, pressure-sensitive adhesive layer formation methods are employable. The pressure-sensitive adhesive layer formation method varies depending on the polymerization method for the polymer, and is therefore not specifically defined. For example, in the case that the pressure-sensitive adhesive layer of the invention is an acrylic pressure-sensitive adhesive layer, the following methods (1) to (3) are mentioned. (1) A composition comprising a mixture of monomer ingredients (monomer mixture) for forming an acrylic polymer or its prepolymer, and optionally additives such as a photopolymerization initiator, a crosslinking agent or the like is applied onto a substrate or separator by coating, and irradiated with active energy rays (especially preferably UV rays) to form a pressure-sensitive adhesive layer thereon. (2) A composition (solution) containing an acrylic polymer, a solvent, and optionally additives such as a crosslinking agent or the like is applied onto a substrate or separator by coating, and dried and/or cured to form a pressure-sensitive adhesive layer thereon. (3) The pressure-sensitive adhesive layer formed according to (1) is further dried.

For the coating with the composition for forming the pressure-sensitive adhesive layer, employable is any known coating method with an ordinary coater, for example, a gravure roll coater, a reverse roll coater, a kiss roll coater, a dip roll coater, a bar coater, a knife coater, a spray coater, a comma coater, a direct coater, etc.

(Substrate)

In case where the pressure-sensitive adhesive sheet of the invention includes a substrate, examples of the substrate include, but not specifically defined thereto, various types of optical films such as plastic films, antireflection (AR) films, polarizers, retarders, etc. The material of the plastic films includes plastic materials, for example, polyester resins such as polyethylene terephthalate (PET), etc.; acrylic resins such as polymethyl methacrylate (PMMA), etc.; polycarbonates, triacetyl cellulose (TAC), polysulfones, polyarylates, polyimides, polyvinyl chloride, polyvinyl acetate, polyethylene, polypropylene, ethylene/propylene copolymer, cyclic olefin polymers such as Arton (cyclic olefin polymer, JSR's trade name), Zeonoa (cyclic olefin polymer, Nippon Zeon's trade name), etc. One or more such plastic materials may be used here either singly or as combined. The "substrate" herein is a part of the double-sided pressure-sensitive adhesive sheet which is applied (stuck) to an adherend (optical member, etc.) along with the pressure-sensitive adhesive layer of the sheet when the sheet is applied (stuck) to the adherend. A separator (release liner) to be removed in use (application) of the pressure-sensitive adhesive sheet is not within the category of the "substrate".

Of the above, preferred is a transparent substrate. The "transparent substrate" is, for example, preferably one having a whole light transmittance (according to JIS K7361) in a visible light wavelength range of at least 85%, more preferably at least 88%. The haze (according to JIS K7361) of the substrate is, for example, preferably at most 1.5%, ore preferably at most 1.0%. Examples of the transparent substrate include PET films, and nonorientation films such as Arton (trade name), Zeonoa (trade name), etc.

Not specifically defined, the thickness of the substrate is, for example, preferably from 12 to 75 µm. The substrate may have a single-layer or multi-layer structure. The surface of the substrate may be suitably processed for known or conventional surface treatment of physical treatment such as corona discharge treatment, plasma treatment or the like, or chemical treatment such as undercoating treatment, etc.

In case where the pressure-sensitive adhesive sheet of the invention includes a substrate, various functional films may be used for the substrate. In this case, the pressure-sensitive adhesive sheet of the invention may be a pressure-sensitive adhesive functional sheet having the pressure-sensitive adhesive layer of the invention on at least one surface of the functional film. Not specifically defined, the functional film includes, for example, films with optical functionality (e.g., polarizability, light refractivity, light reflectivity, light transmittance, light absorbability, light diffraction capability, optical rotation capability, visibility), electroconductive films (e.g., ITO film), UV-cut films, hard coat films (with scratch resistance), etc. More concretely, there are mentioned hard coat films (plastic films such as PET films of which at least one surface is subjected to hard coat treatment), polarization films, wave plates, retardation films, optical compensation films, brightening films, light guide plates, reflection films, antireflection films, transparent electroconductive films (e.g., ITO film), design films, decoration films, surface-protected films, prisms, color filters, etc. "Plate" and "film" as referred to herein shall include plate-like, film-like and sheet-like forms; and for example, "polarization film" shall include "polarization plate" and "polarization sheet". "Functional film" shall include "functional plate" and "functional sheet".

(Other Pressure-Sensitive Adhesive Layer)

In case where the pressure-sensitive adhesive sheet of the invention has any other adhesive layer, the other adhesive layer is not specifically defined, for which, for example, there may be mentioned any known or conventional adhesive layer formed of a known adhesive such as an urethane adhesive, an acrylic adhesive, a rubber adhesive, a silicone adhesive, a polyester adhesive, a polyamide adhesive, an epoxy adhesive, a vinyl alkyl ether adhesive, a fluorine-containing adhesive, etc. One or more such adhesives may be used either singly or as combined.

(Separator)

The pressure-sensitive adhesive layer surface (pressure-sensitive adhesive surface) of the pressure-sensitive adhesive sheet of the invention may be protected with a separator (release liner) until use. In case where the pressure-sensitive adhesive sheet of the invention is a double-sided pressure-sensitive adhesive sheet, the two pressure-sensitive adhesive faces may be individually coated with two separators, or may be protected with one, double-sided releasable separator to be in the form of a wound-up roll. The separator serves as a protective material for the pressure-sensitive adhesive layer, and when the pressure-sensitive adhesive sheet is attached to an adherend, the separator is peeled away. In case where the pressure-sensitive adhesive sheet of the invention is a substrateless pressure-sensitive adhesive sheet, the separator serves also as a support for the pressure-sensitive adhesive layer. The separator is not indispensable. As the separator, usable is any ordinary release paper or the like. Not specifically defined, also usable are a support having a lubrication-processed layer, a poorly-adhesive support comprising a fluorine-containing polymer, a poorly-adhesive support comprising a non-polar polymer, etc. Examples of the support having a lubrication-processed layer include plastic films and paper surface-treated with a lubrication-processing agent such as silicone compounds, long-chain alkyl compounds, fluorine compounds, molybdenum sulfide, etc. Examples of the fluorine-containing polymer for the poorly-adhesive support comprising a fluorine-containing polymer include poly-tetrafluoroethylene, polychlorotrifluoroethylene, polyvinyl fluoride, polyvinylidene fluoride, tetrafluoroethylene/hexafluoroethylene copolymer, chlorofluoroethylene/vinylidene fluoride copolymer, etc. Examples of the non-polar polymer include olefinic resins (e.g., polyethylene, polypropylene), etc. The separator may be formed in any known or conventional method. The thickness of the separator is not specifically defined.

Optical-Use pressure-sensitive adhesive sheet

The pressure-sensitive adhesive sheet of the invention includes a pressure-sensitive adhesive layer containing a polymer formed of one or more monomer ingredients including, as an indispensable monomer ingredient, a monomer of which homopolymer has a glass transition temperature (Tg) of not lower than −10° C., and the sheet has a moisture content of at least 0.65% by weight after stored in an environment at 60° C. and 95% RH for 120 hours. The moisture content of the pressure-sensitive adhesive sheet of the invention after stored (immediately after stored) in an environment at 60° C. and 95% RH for 120 hours is at least 0.65% by weight (for example, from 0.65 to 5.0% by weight), preferably from 0.65 to 3.0% by weight, more preferably from 0.75 to 3.0% by weight. When the moisture content is less than 0.65% by weight, then the pressure-sensitive adhesive sheet may get cloudy by humidification, and therefore the pressure-sensitive adhesive sheet may have some negative influence on the visibility and the outward appearance retentivity of the optical articles or optical member with the pressure-sensitive adhesive sheet attached thereto.

It is considered that the whitening of the pressure-sensitive adhesive sheet by humidification is a phenomenon caused by moisture absorption by the pressure-sensitive adhesive layer through humidification (for example, storing the sheet in high-temperature/high-humidity environment) followed by dew condensation of the absorbed moisture in the layer. In the invention, the moisture content in the pressure-sensitive adhesive sheet (after stored in an environment at 60° C. and 95% RH for 120 hours) is controlled to be at least 0.65% by weight; and therefore, for example, when the pressure-sensitive adhesive sheet is restored from the high-temperature/high-humidity environment to a room temperature environment, the moisture absorbed by the pressure-sensitive adhesive layer hardly condensates to form dew owing to the high water absorbability of the pressure-sensitive adhesive sheet, and as a result, it is considered that the pressure-sensitive adhesive sheet can be prevented from getting cloudy by humidification.

The moisture content is preferably measured after the pressure-sensitive adhesive sheet of the invention is stored in an environment at 60° C. and 95% RH for 120 hours and immediately after taken out in a room temperature environment (23° C., 50% RH) (for example, in 0 to 10 minutes or so after taken out in the room temperature environment). Concretely, the moisture content of the pressure-sensitive adhesive sheet of the invention may be measured after the pressure-sensitive adhesive sheet is stored in an environment at 60° C. and 95% RH for 120 hours and then taken out in an environment at 23° C. and 50% RH, according to "Method for Measuring Moisture Content in Pressure-Sensitive Adhesive Sheet" described below.

Method for Measuring Moisture Content in Pressure-Sensitive Adhesive Sheet (Method of Preparing and Measuring Sample)

In case where the pressure-sensitive adhesive sheet of the invention is a double-sided pressure-sensitive adhesive sheet, the pressure-sensitive adhesive sheet is cut into a piece having a size of 1 cm width×2 cm length (area 2 cm$^2$); and when it has a separator, the separator is removed. One pressure-sensitive adhesive face (pressure-sensitive adhesive layer surface) is stuck to an aluminium foil, and the other pressure-sensitive adhesive face is left open; and in this manner, a test sample is prepared. In case where the pressure-sensitive adhesive sheet of the invention is a single-sided pressure-sensitive adhesive sheet, this is cut into a piece having a size of 1 cm width×2 cm length (area 2 cm$^2$); and when it has a separator, the separator is removed, and a test sample is thus prepared.

The sample is weighed, then put into a heating and vaporization chamber, and heated at 150° C. therein, and the generated gas is introduced into a titration cell. Next, using a coulometric titrator for moisture content measurement, the moisture content (μg) in the sample is measured under the measurement condition mentioned below. Consequently, the moisture content per gram of the sample (in case where the sample is a double-sided pressure-sensitive adhesive sheet, the weight of the aluminium foil is subtracted from the weight of the sample, and the moisture content is per gram of the adhesive sheet sample with no aluminium foil) is computed, and the moisture content (% by weight) of the analyzed pressure-sensitive adhesive sheet is thus determined. The number of measurements (number, n) is, for example, preferably two.

(Analytical Instrumentation)

Coulometric titrator for moisture content measurement: Mitsubishi Chemical's CA-06 Model Heating and vaporization chamber: Mitsubishi Chemical's VA-06 Model (Measurement Condition)

Method: Heating and vaporization method/heating at 150° C.

Anode plate: Aquamicron AKX

Cathode plate: Aquamicron CXU

In case where the pressure-sensitive adhesive sheet is a double-sided adhesive sheet, preferably, the moisture content in the double-sided adhesive sheet satisfies the above range in any case where the pressure-sensitive adhesive layer surface on any side of the sample is kept open during the test.

The moisture content in the pressure-sensitive adhesive sheet of the invention at 23° C. and 50% RH is preferably from 0.36 to 4.0% by weight, more preferably from 0.36 to 2.5% by weight. When the moisture content is less than 0.36% by weight, the pressure-sensitive adhesive sheet may sometimes get cloudy by humidification. The moisture content may be measured after the pressure-sensitive adhesive sheet of the invention is stored in an environment at 23° C. and 50% RH for at least 72 hours, according to the above-mentioned "Method for Measuring Moisture Content in Pressure-Sensitive Adhesive Sheet".

Preferably, the moisture content in the pressure-sensitive adhesive sheet of the invention after (immediately after) stored in an environment at 23° C. and 95% RH for 120 hours is from 0.56 to 5.0% by weight, more preferably from 0.56 to 3.0% by weight. When the moisture content is less than 0.56% by weight, then the pressure-sensitive adhesive sheet may sometimes get cloudy by humidification. The moisture content may be measured after the pressure-sensitive adhesive sheet of the invention is stored in an environment at 23° C. and 95% RH for 120 hours, according to the above-mentioned "Method for Measuring Moisture Content in Pressure-Sensitive Adhesive Sheet".

The haze of the pressure-sensitive adhesive sheet of the invention is, for example, preferably at most 3.0%, more preferably at most 1.5%. When the haze is more than 3.0%, then the transparency and the outward appearance of the optical articles or the optical members with the pressure-sensitive adhesive sheet attached thereto may worsen in some cases. The haze may be measured, for example, by attaching the pressure-sensitive adhesive sheet of the invention to a slide glass (for example, having a whole light transmittance of 91.8% and a haze of 0.4%) and analyzing it with a haze meter (Murakami Color Search Laboratory's trade name "HM-150").

Not specifically defined, the whole light transmittance of the pressure-sensitive adhesive sheet of the invention is preferably at least 87%, more preferably at least 89%. When the whole light transmittance is less than 87%, then the transparency and the outward appearance of the optical articles or the optical members with the pressure-sensitive adhesive sheet attached thereto may worsen in some cases. The whole light transmittance may be measured, for example, by attaching the pressure-sensitive adhesive sheet of the invention to a slide glass (for example, having a whole light transmittance of 91.8% and a haze value of 0.4%) and analyzing it with a haze meter (Murakami Color Search Laboratory's trade name "HM-150").

Not specifically defined, the haze of the pressure-sensitive adhesive sheet of the invention after stored (immediately after stored) in an environment at 60° C. and 95% RH for 120 hours (hereinafter this may be referred to as "haze (immediately after stored under wet heat)") is preferably at most 3.5%, more preferably at most 2.5%. When the haze (immediately after stored under wet heat) is more than 3.5%, then the pressure-sensitive adhesive sheet may have some negative influence on the visibility and the outward appearance retentivity of the products and the optical members with the pressure-sensitive adhesive sheet attached thereto. The haze (immediately after stored under wet heat) may be measured, for example, by attaching the pressure-sensitive adhesive sheet of the invention to a slide glass (for example, having a whole light transmittance of 91.8% and a haze value of 0.4%), then storing it in an environment at 60° C. and 90% RH for 120 hours, taking it out in an environment at 23° C. and 50% RH, and immediately analyzing it with a haze meter (Murakami Color Search Laboratory's trade name "HM-150").

Not specifically defined, the whole light transmittance of the pressure-sensitive adhesive sheet of the invention after stored (immediately after stored) in an environment at 60° C. and 95% RH for 120 hours (hereinafter this may be referred to as "whole light transmittance (immediately after stored under wet heat)") is preferably at least 87%, more preferably at least 89%. When the whole light transmittance (immediately after stored under wet heat) is less than 87%, then the pressure-sensitive adhesive sheet may have some negative influence on the visibility and the outward appearance retentivity of the products and the optical members with the pressure-sensitive adhesive sheet attached thereto. The while light transmittance (immediately after stored under wet heat) may be measured, for example, by attaching the pressure-sensitive adhesive sheet of the invention to a slide glass (for example, having a whole light transmittance of 91.8% and a haze value of 0.4%), then storing it in an environment at 60° C. and 90% RH for 120 hours, taking it out in an environment at 23° C. and 50% RH, and immediately analyzing it with a haze meter (Murakami Color Search Laboratory's trade name "HM-150").

Not specifically defined, the haze of the pressure-sensitive adhesive sheet of the invention after stored in an environment at 60° C. and 95% RH for 120 hours and then stored in an environment at 23° C. and 50% RH for 2 hours (hereinafter this may be referred to as "haze (in 2 hours after stored under wet heat)") is preferably at most 3.0%, more preferably at most 2.5%. When the haze (in 2 hours after stored under wet heat) is more than 3.0%, then the pressure-sensitive adhesive sheet may have some negative influence on the visibility and the outward appearance retentivity of the products and the optical members with the pressure-sensitive adhesive sheet attached thereto. The haze (in 2 hours after stored under wet heat) may be measured, for example, by attaching the pressure-sensitive adhesive sheet of the invention to a slide glass (for example, having a whole light transmittance of 91.8% and a haze value of 0.4%), then storing it in an environment at 60° C. and 95% RH for 120 hours, further storing it in an environment at 23° C. and 50% RH for 2 hours, and thereafter analyzing it with a haze meter (Murakami Color Search Laboratory's trade name "HM-150").

Not specifically defined, the whole light transmittance of the pressure-sensitive adhesive sheet of the invention after stored in an environment at 60° C. and 95% RH for 120 hours and then stored in an environment at 23° C. and 50% RH for 2 hours (hereinafter this may be referred to as "whole light transmittance (in 2 hours after stored under wet heat)") is preferably at least 87%, more preferably at lest 89%. When the whole light transmittance (in 2 hours after stored under wet heat) is less than 87%, then the pressure-sensitive adhesive sheet may have some negative influence on the visibility and the outward appearance retentivity of the products and the optical members with the pressure-sensitive adhesive sheet attached thereto. The whole light transmittance (in 2 hours after stored under wet heat) may be measured, for example, by attaching the pressure-sensitive adhesive sheet of the invention to a slide glass (for example, having a whole light transmittance of 91.8% and a haze value of 0.4%), then storing it in an environment at 60° C. and 95% RH for 120 hours, further storing it in an environment at 23° C. and 50% RH for 2 hours, and thereafter analyzing it with a haze meter (Murakami Color Search Laboratory's trade name "HM-150").

Not specifically defined, the 180-degree peel adhesion force at 80° C. of the pressure-sensitive adhesive sheet of the invention with respect to an acrylic plate (hereinafter this may be referred to as "peel adhesion force (with respect to acrylic plate, 180° peeling at 80° C.)") is preferably at least 3.5 N/20 mm (for example, from 3.5 to 20 N/20 mm), more preferably from 3.7 to 15 N/20 mm. When the peel adhesion force (with respect to acrylic plate, 180° peeling at 80° C.) is less than 3.5 N/20 mm, then the foaming/peeling resistance at high temperatures of the pressure-sensitive adhesive sheet may be poor and the adhesion reliability thereof may lower in some cases. The peel adhesion force (with respect to acrylic plate, 180° peeling at 80° C.) may be determined in a 180° peeling test where the adherend is an acrylic plate. Concretely, for example, according to JIS Z0237, an acrylic plate (Mitsubishi Rayon's "Acrylite MR-200" having a thickness of 2 mm) is used as an adherend (test plate), the surface of the pressure-sensitive adhesive layer of the pressure-sensitive adhesive sheet of the invention is attached to the adherend in an environment at 23° C. and 50% RH, and then peeled at 180 degrees at 80° C. under the condition of a peeling speed of 300 mm/min, whereby the intended peel adhesion force of the sheet is measured. In case where the pressure-sensitive adhesive sheet is a double-sided pressure-sensitive adhesive sheet, a liner (for example, PET film having a thickness of 25 μm) may be attached to the surface of the pressure-sensitive adhesive layer (pressure-sensitive adhesive face) on the side opposite to the side to be analyzed. In the case of the double-sided adhesive sheet, it is sufficient that the surface of the pressure-sensitive adhesive layer of the invention satisfy the above range in point of the peel adhesion force (with respect to acrylic plate, 180° peeling at 80° C.) thereof.

The pressure-sensitive adhesive sheet of the invention has excellent adhesion force at high temperatures and its floating or peeling from the adherend can be prevented or retarded. The pressure-sensitive adhesive sheet does not get cloudy by humidification. Accordingly, this is used as an optical-use pressure-sensitive adhesive sheet, which is used in attaching optical members or in producing optical articles. The optical member is meant to indicate a member having optical properties (for example, polarization, light refractivity, light scatterability, light reflectivity, light transmission, light absorption, light diffraction, optical rotation, visibility). Not specifically defined, the optical member may be any member having optical properties, and examples thereof include members constituting optical articles such as display devices (image display devices), input devices, etc., and members for use for those instruments (optical articles). For example, they include polarizer, wave plate, retarder, optical compensatory film, brightness increasing film, light guide plate, reflection film, antireflection film, transparent conductive film (ITO film, etc.), design film, decoration film, surface protective film, prism, lens, color filter, transparent substrate, and members laminated with these (these may be referred to as a generic term of "functional film"). "Plate" and "film" as referred to herein shall include plate-like, film-like and sheet-like forms; and for example, "polarization film" shall include "polarization plate" and "polarization sheet". The "functional film" shall include "functional plate" and "functional sheet".

Examples of the display device (image display device) include liquid-crystal display devices, organic EL (electroluminescent) display devices, PDP (plasma display panels), electronic papers, etc. Examples of the input device include touch panels, etc.

Not specifically defined, examples of the optical member include members (e.g., sheet-like, film-like or plate-like members) made of acrylic resin, polycarbonate resin, polyethylene terephthalate, glass, metal thin film, etc. The "optical member" in the invention may include members that play a role of decoration or protection (design film, decoration film, surface protective film, etc.) while securing the visibility of the object, display device and input device, as described in the above.

In the pressure-sensitive adhesive sheet of the invention, in case where the pressure-sensitive adhesive layer is an acrylic pressure-sensitive adhesive layer and where the content of the carboxyl group-having monomer as a monomer ingredient for forming the acrylic polymer in the acrylic pressure-sensitive adhesive layer is controlled to fall within the above-mentioned specific range, the pressure-sensitive adhesive sheet exhibits excellent corrosion resistance, and is therefore especially favorably used to be attached to a metal thin film (metal thin film or metal oxide thin film). Not specifically defined, examples of the metal thin film include a thin film of a metal, a metal oxide or their mixture. For example, the metal thin film is a thin film of ITO (indium tin oxide), ZnO, SnO or CTO (cadmium tin oxide). Also not specifically defined, the thickness of the metal thin film is preferably from 100 to 2600 angstroms. The metal thin film of ITO or the like is provided, for example, on a PET film and is used as a transparent electroconductive film. Since the pressure-sensitive adhesive layer in the invention has excellent corrosion resistance, when the pressure-sensitive adhesive sheet of the invention is attached to a metal thin film, the surface of the pressure-sensitive adhesive layer of the pressure-sensitive adhesive sheet preferably faces the metal thin film.

One example of concrete applications of the pressure-sensitive adhesive sheet of the invention is a pressure-sensitive adhesive sheet for touch panels to be used in production of touch panels. For example, in production of capacitance-type touch panels, the pressure-sensitive adhesive sheet of the invention may be used for attaching a polymethyl methacrylate (PMMA) film, a hard coat film, a glass lens or the like to a transparent electroconductive film coated with a metal thin film of ITO or the like, via the pressure-sensitive adhesive sheet of the invention. Not specifically defined, the touch panels may be used in portable telephones employing touch panels, etc.

In case where the pressure-sensitive adhesive sheet of the invention is a double-sided pressure-sensitive adhesive sheet, it may be attached to and laminated on at least one surface of various functional films, thereby producing a pressure-sensitive adhesive-type functional film having the pressure-sensitive adhesive layer of the invention on at least one surface of the functional film. The functional film is described hereinabove. The pressure-sensitive adhesive sheet (double-sided pressure-sensitive adhesive sheet) of the invention to be used for the above-mentioned functional films may be a substrateless pressure-sensitive adhesive sheet or a substrate-having type pressure-sensitive adhesive sheet.

EXAMPLES

The invention is described in more detail with reference to the following Examples, to which, however, the invention should not be limited. The monomer composition and the pressure-sensitive adhesive composition used in Examples and Comparative Examples are shown in Table 1. In Table 1, the amount (added amount) of Coronate HL is in terms of the amount (part by weight) of the solid content thereof.

Example 1

0.05 parts by weight of "Irgacure 184" (trade name by Ciba Specialty Chemicals) and 0.05 parts of "Irgacure 651" (trade name by Ciba Specialty Chemicals) both serving as a photopolymerization initiator were added to a mixture of 57 parts by weight of 2-ethylhexyl acrylate (2EHA), 22 parts by weight of isobornyl acrylate (IBXA) and 21 parts by weight of 2-hydroxyethyl acrylate (HEA), and then irradiated with UV rays until the viscosity thereof (as measured with a BH viscometer No. 5 Rotor, at 10 rpm and at 30° C.) could reach about 20 Pa·s, thereby preparing a prepolymer composition where a part of the monomer ingredients were polymerized.

0.06 parts by weight of dipentaerythritol hexaacrylate (DPHA) (Nippon Kayaku's trade name, "KAYARAD DPHA-40H") was added to 100 parts by weight of the prepolymer composition prepared in the above, thereby giving a pressure-sensitive adhesive composition.

The pressure-sensitive adhesive composition was applied onto a polyethylene terephthalate (PET) separator (Mitsubishi Resin's "MRF75") to be in a final thickness (pressure-sensitive adhesive layer thickness) of 175 µm, thereby forming a coating layer thereon. Next, on the coating layer, a PET separator (Mitsubishi Resin's "MRF38") was provided to cover the coating layer, whereby the coating layer was shielded from oxygen. Subsequently, using a black light (by Toshiba), the top face (on the side of MRF38) of the MRF75/coating layer/MRF38 laminate was irradiated with UV rays at an illumination intensity of 5 mW/cm$^2$ for 300 seconds. Further, this was dried with a drier at 130° C. for 2 minutes to remove the remaining monomers through vaporization, thereby forming an acrylic pressure-sensitive adhesive layer. The process gave a double-sided pressure-sensitive adhesive sheet (substrateless double-sided pressure-sensitive adhesive sheet) having a thickness of 175 µm.

Example 2

A double-sided pressure-sensitive adhesive sheet (substrateless double-sided pressure-sensitive adhesive sheet)

having a thickness of 175 μm was produced in the same manner as in Example 1, except that a mixture of 80 parts by weight of 2-ethylhexyl acrylate (2EHA), 11.5 parts by weight of 2-methoxyethyl acrylate (2MEA), 7 parts by weight of N-vinyl-2-pyrrolidone (NVP), 1.5 parts by weight of hydroxyethylacrylamide (HEAA) and 5 parts by weight of 2-hydroxyethyl acrylate (HEA) was used as shown in Table 1.

Example 3

A double-sided pressure-sensitive adhesive sheet (substrateless double-sided pressure-sensitive adhesive sheet) having a thickness of 175 μm was produced in the same manner as in Example 2, except that the amount of 2-hydroxyethyl acrylate (HEA) was changed to 10 parts by weight as shown in Table 1.

Example 4

A double-sided pressure-sensitive adhesive sheet (substrateless double-sided pressure-sensitive adhesive sheet) having a thickness of 175 μm was produced in the same manner as in Example 2, except that the amount of 2-hydroxyethyl acrylate (HEA) was changed to 15 parts by weight as shown in Table 1.

Example 5

80 parts by weight of 2-ethylhexyl acrylate (2EHA), 11.5 parts by weight of 2-methoxyethyl acrylate (2MEA), 7 parts by weight of N-vinyl-2-pyrrolidone (NVP), 1.5 parts by weight of hydroxyethylacrylamide (HEAA) and 10 parts by weight of 2-hydroxyethyl acrylate (HEA) as monomer ingredients; 0.2 parts by weight of 2,2'-azobisisobutyronitrile as a polymerization initiator; and 200 parts by weight of ethyl acetate as a polymerization solvent were put into a separable flask, and stirred for 1 hour with introducing nitrogen gas thereinto. After oxygen inside the polymerization system was purged off in that manner, the system was heated up to 63° C. and reacted for 10 hours, and then toluene was added thereto to give an acrylic polymer having a solid concentration of 30% by weight.

As shown in Table 1, a polyfunctional isocyanate compound (Nippon Polyurethane Industry's trade name "Coronate HL", having a solid content of 75% by weight) as a crosslinking agent in an amount of 0.5 parts by weight in terms of the solid content thereof was added to 100 parts by weight of the acrylic polymer, thereby preparing a pressure-sensitive adhesive composition (solution). The pressure-sensitive adhesive composition (solution) was applied onto the lubrication-processed surface of a polyethylene terephthalate (PET) separator (Mitsubishi Resin's "MRF75") whose surfaces had been processed for lubrication treatment so as to be in a dry thickness of 175 μm, heated and dried at 60° C. for 3 minutes and at 155° C. for 4 minutes under normal pressure, and further aged at 50° C. for 72 hours, thereby giving a double-sided pressure-sensitive adhesive sheet (substrateless double-sided pressure-sensitive adhesive sheet).

Comparative Example 1

A double-sided pressure-sensitive adhesive sheet (substrateless double-sided pressure-sensitive adhesive sheet) having a thickness of 175 μm was produced in the same manner as in Example 2, except that hydroxyethyl acrylate (HEA) was not used as in Table 1.

Comparative Example 2

95 parts by weight of n-butyl acrylate (BA) and 5 parts by weight of acrylic acid (AA) as monomer ingredients; 0.2 parts by weight of 2,2'-azobisisobutyronitrile as a polymerization initiator; and 186 parts by weight of ethyl acetate as a polymerization solvent were put into a separable flask, and stirred for 1 hour with introducing nitrogen gas thereinto. After oxygen inside the polymerization system was purged off in that manner, the system was heated up to 63° C. and reacted for 10 hours, and then toluene was added thereto to give an acrylic polymer having a solid concentration of 30% by weight.

On the other hand, 95 parts by weight of cyclohexyl methacrylate (CHMA) and parts by weight of acrylic acid (AA) as monomer ingredients; 3 parts by weight of 2-mercaptoethanol as a chain transfer agent; 0.2 parts by weight of 2,2'-azobisisobutyronitrile as a polymerization initiator; and 100 parts by weight of toluene as a polymerization solvent were put into a separable flask, and stirred for 1 hour with introducing nitrogen gas thereinto. After oxygen inside the polymerization system was purged off in that manner, the system was heated up to 70° C. and reacted for 3 hours, and further reacted at 75° C. for 2 hours thereby giving an acrylic oligomer solution having a solid concentration of 50% by weight.

As shown in Table 1, to the acrylic polymer solution, relative to 100 parts by weight of the acrylic polymer, the acrylic oligomer in an amount of 20 parts by weight (that is, in an amount of 20 parts by weight, in terms of the solid content of the acrylic oligomer solution) and a polyfunctional isocyanate compound (Nippon Polyurethane Industry's trade name "Coronate HL", having a solid content of 75% by weight) as a crosslinking agent in an amount of 0.5 parts by weight in terms of the solid content thereof were added, thereby preparing a pressure-sensitive adhesive composition (solution).

The pressure-sensitive adhesive composition (solution) was applied onto the lubrication-processed surface of a polyethylene terephthalate (PET) separator (Mitsubishi Resin's "MRF75") whose surfaces had been processed for lubrication treatment so as to be in a dry thickness of 175 μm, heated and dried at 60° C. for 3 minutes and at 155° C. for 4 minutes under normal pressure, and further aged at 50° C. for 72 hours, thereby giving a double-sided pressure-sensitive adhesive sheet (substrateless double-sided pressure-sensitive adhesive sheet).

Comparative Example 3

A double-sided pressure-sensitive adhesive sheet (substrateless double-sided pressure-sensitive adhesive sheet) having a thickness of 175 μm was produced in the same manner as in Example 1, except that 100 parts by weight of 2-ethylhexyl acrylate (2EHA) was used as the monomer as shown in Table 1.

TABLE 1

|  | Monomer Blend Formulation | Constituent Ingredients of Pressure-Sensitive Adhesive Composition | | | |
|---|---|---|---|---|---|
|  | Kinds of monomers blend ratio of monomers (by weight) | Prepolymer composition; acrylic polymer(*1) (part by weight) | DPHA (part by weight) | Coronate HL (part by weight) | Acrylic oligomer (part by weight) |
| Example 1 | 2EHA/IBXA/HEA 57/22/21 | 100 | 0.06 | — | — |
| Example 2 | 2EHA/2MEA/NVP/HEAA/HEA 80/11.5/7/1.5/5 | 100 | 0.06 | — | — |
| Example 3 | 2EHA/2MEA/NVP/HEAA/HEA 80/11.5/7/1.5/10 | 100 | 0.06 | — | — |
| Example 4 | 2EHA/2MEA/NVP/HEAA/HEA 80/11.5/7/1.5/15 | 100 | 0.06 | — | — |
| Example 5 | 2EHA/2MEA/NVP/HEAA/HEA 80/11.5/7/1.5/10 | 100 | — | 0.5 | — |
| Comparative Example 1 | 2EHA/2MEA/NVP/HEAA 80/11.5/7/1.5 | 100 | 0.06 | — | — |
| Comparative Example 2 | BA/AA 95/5 | 100 | — | 0.5 | 20 |
| Comparative Example 3 | 2EHA 100 | 100 | 0.06 | — | — |

(*1)Prepolymer composition was used in Examples 1 to 4 and Comparative Examples 1 and 3; and acrylic polymer was used in Example 5 and Comparative Example 2.
The abbreviations in Table 1 are as follows:
2EHA: 2-ethylhexyl acrylate
2MEA: 2-methoxyethyl acrylate
BA: n-butyl acrylate
IBXA: isobornyl acrylate
NVP: N-vinyl-2-pyrrolidone
HEAA: hydroxyethylacrylamide
AA: acrylic acid
HEA: 2-hydroxyethyl acrylate
DPHA: dipentaerythritol hexaacrylate
Coronate HL: isocyanate-type crosslinking agent (polyfunctional isocyanate compound) (by Nippon Polyurethane Industry)

(Evaluation)

The double-sided pressure-sensitive adhesive sheet (acrylic pressure-sensitive adhesive layer) in Examples and Comparative Examples was evaluated as in Table 2. The samples were evaluated for the haze, the whole light transmittance, the outward appearance and the peel adhesion force thereof, and tested for the corrosion resistance thereof, according to the methods mentioned below. For the moisture content, the samples were analyzed according to the above-mentioned "Method for Measuring Moisture Content in Pressure-Sensitive Adhesive Sheet", in which the moisture content in each sample after stored in an environment at 60° C. and 95% RH for 120 hours, the moisture content therein after stored in an environment at 23° C. and 50% RH for 72 hours, the moisture content therein after stored in an environment at 23° C. and 95% RH for 120 hours were measured. The found data of the moisture content are shown in the columns, "Moisture Content after stored at 60° C. and 95% RH for 120 hours", "Moisture Content at 23° C. and 50% RH" and "Moisture Content after stored at 23° C. and 95% RH for 120 hours" in Table 2.

(1) Haze and Whole Light Transmittance:

The separators were peeled from the double-sided pressure-sensitive adhesive sheet obtained in Examples and Comparative Examples, and one pressure-sensitive adhesive face of the double-sided pressure-sensitive adhesive sheet was stuck to a slide glass (Matsunami Glass's trade name, "MICRO SLIDE GLASS", Lot Code "S", having a thickness of 1.3 mm and a haze of 0.1%—Mizu Fuchi-migald), while the other face thereof was stuck to a PET film (Toyobo's trade name, "A4100", having a thickness of 100 μm and a haze of 0.6%), thereby preparing a test piece having a constitution of "slide glass/acrylic pressure-sensitive adhesive layer/PET film".

The haze at 23° C. and 50% RH (23° C. 50% RH haze) of the test piece was measured, using a haze meter (Murakami Color Search Laboratory's trade name "HM-150"). The found data are show in the column of "Haze at 23° C. and 50% RH" in Table 2.

The test piece was stored in an environment at 60° C. and 95% RH for 120 hours, and immediately after taken out in an environment at 23° C. and 50% RH (0 hour), and in 2 hours after taken out, the haze and the whole light transmittance of each test piece were measured. The found data are shown in the columns of "Haze in 0 hour after stored at 60° C. and 95% RH for 120 hours", "Whole Light Transmittance in 0 hour after stored at 60° C. and 95% RH for 120 hours", "Haze in 2 hours after stored at 60° C. and 95% RH for 120 hours" and "Whole Light Transmittance in 2 hours after stored at 60° C. and 95% RH for 120 hours" in Table 2.

(2) Outward Appearance (after Stored in an Environment at 60° C. and 95% RH for 120 Hours):

The test pieces (having a constitution of "slide glass/ acrylic adhesive layer/PET film") stored in an environment at 60° C. and 95% RH for 120 hours and immediately (in 0 hour) after taken out in an environment at 23° C. and 50% RH, which had been used in the above-mentioned measurement (1), were visually checked for the outward appearance thereof. The samples not showing cloudiness in visual observation were evaluated as "A" (with good outward appearance retentivity), while those showing cloudiness in visual observation were evaluated as "B" (with bad outward appearance retentivity). The results are shown in the column of "Outward Appearance after stored at 60° C. and 95% RH for 120 hours" in Table 2.

(3) Peel Adhesion Force (with Respect to Acrylic Plate, 180° Peeling at 80° C.):

The double-sided pressure-sensitive adhesive sheet produced in Examples and Comparative Examples was cut into a piece having a size of 20 mm width×100 mm length, the separators were peeled off, and a PET film (Toray's "Lumirror S-10", having a thickness of 25 μm) was stuck (as a lining)

to one pressure-sensitive adhesive face (opposite to the face to be tested) of the double-sided pressure-sensitive adhesive sheet, thereby preparing a long rectangular tape piece.

Next, in an environment at 23° C. and 50% RH, the other pressure-sensitive adhesive face (test face) of the tape piece was stuck under pressure to an acrylic plate (Mitsubishi Rayon's "Acrylite MR-200", having a thickness of 2 mm" with a 2-kg rubber roller (having a width of about 50 mm) made to run thereon once back and forth, thereby preparing a test sample.

The test sample was stored in an environment at 80° C. for 30 minutes. Using a tensile tester, this was tested for the peel adhesion force thereof according to JIS Z 0237 (with respect to acrylic plate, 180° peeling at 80° C.) (N/20 mm). Regarding the test condition, the sample was tested in an environment at 80° C., at a peeling angle of 180° C. and at a pulling speed of 300 mm/min. The found data are shown in the column of "Peel Adhesion Force (with respect to acrylic plate, 180° peeling at 80° C.)" in Table 2.

(4) Corrosion Resistance Test:

A PET film (Toray's trade name, "Lumirror S-10#25" having a thickness of 25 μm) was stuck to one side of the double-sided pressure-sensitive adhesive sheet produced in Examples and Comparative Examples, and cut into a test piece having a size of 20 mm width×50 mm length.

Figure 2:
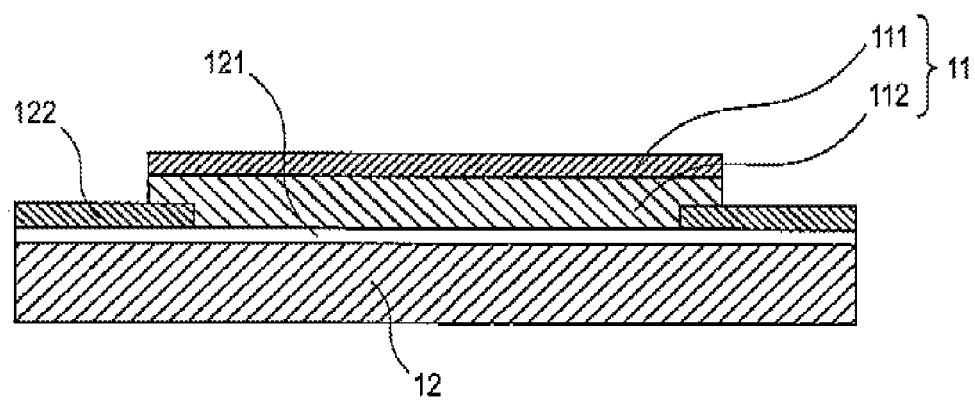
FIG. 2 is an outline view (A-A cross-sectional view of FIG. 1) showing the sample for resistance measurement, used in the corrosion resistance test in Examples.

As shown in FIG. 1 and FIG. 2, a silver paste was applied onto both edges to a width of 15 mm of an electroconductive PET film 12 (Nitto Denko's trade name, "Elecrysta V-270 TFMP") (having a size of 70 mm length×25 mm width), and the pressure-sensitive adhesive face of the separator-peeled test piece 11 was stuck to the electroconductive face (on the side of the ITO film-formed face 121). This was left in an environment at 23° C. for 24 hours, and then left in an environment at 60° C. and 95% RH for 168 hours. The ratio (%) of the "resistance value after left at 60° C. and 95% RH for 168 hours" to the "resistance value immediately after stuck" [(resistance value after left at 60° C. and 95% RH for 168 hours)/(resistance value immediately after stuck)×100(%)] was computed.

An electrode was fitted to the silver paste part 122 on both sides of the sample, and using Hioki Electric's "3540 Milliohm Hitester", the resistance value of the sample was measured. The found data of the resistance value are shown in the columns of "Resistance Value immediately after stuck" and "Resistance Value after left at 60° C. and 95% RH for 168 hours". The samples of which the ratio of the "resistance value after left at 60° C. and 95% RH for 168 hours" to the "resistance value immediately after stuck" is less than 120% are evaluated as "good" in point of the corrosion resistance thereof, while the samples of which the ratio is 120% or more are evaluated as "poor" in point of the corrosion resistance thereof, and the results are shown in the column of "Corrosion Resistance" in Table 2.

As a blank, the electroconductive PET film alone without double-sided pressure-sensitive adhesive sheet attached thereto was tested in the same manner, and the ratio of the "resistance value after left at 60° C. and 95% RH for 168 hours" to the "resistance value immediately after stuck" was less than 120%.

TABLE 2

| | Properties of Pressure-Sensitive Adhesive Sheet | | | | | | | |
|---|---|---|---|---|---|---|---|---|
| | | Haze | | | | | | |
| | Haze at 23° C. and 50% RH (%) | Haze in 0 hour after stored at 60° C. and 95% RH for 120 hours (%) | Haze in 2 hours after stored at 60° C. and 95% RH for 120 hours (%) | Whole Light Transmittance | | Moisture Content | | |
| | | | | Whole Light Transmittance in 0 hour after stored at 60° C. and 95% RH for 120 hours (%) | Whole Light Transmittance in 2 hours after stored at 60° C. and 95% RH for 120 hours (%) | Moisture Content at 23° C. and 50% RH (wt. %) | Moisture Content after stored at 23° C. and 95% RH for 120 hours (wt. %) | Moisture Content after stored at 60° C. and 95% RH for 120 hours (wt. %) |
| Example 1 | 0.8 | 1.6 | 0.9 | 89.9 | 90.0 | — | 0.91 | 0.97 |
| Example 2 | 0.8 | 1.9 | 1.1 | 90.0 | 90.0 | 0.36 | 0.56 | 0.85 |
| Example 3 | 0.8 | 1.8 | 1.1 | 90.1 | 89.9 | 0.48 | 0.73 | 0.85 |
| Example 4 | 0.9 | 1.6 | 1.2 | 90.0 | 90.2 | 0.61 | 1.8 | 1.2 |
| Example 5 | 0.8 | 1.6 | 1.0 | 90.0 | 90.1 | 0.6 | 0.88 | 0.92 |
| Comparative Example 1 | 0.8 | 11.3 | 8.1 | 90.1 | 90.0 | 0.28 | — | 0.53 |
| Comparative Example 2 | 0.8 | 4.0 | 3.0 | 89.1 | 89.2 | — | 0.47 | 0.54 |
| Comparative Example 3 | 0.7 | 13.5 | 3.5 | 90.2 | 90.3 | — | 0.052 | 0.069 |

| | Properties of Pressure-Sensitive Adhesive Sheet | | | | |
|---|---|---|---|---|---|
| | | | Corrosion Resistance Test | | |
| | Outward Appearance after stored at 60° C. and 95% RH for 120 hours | Peel Adhesion Force (with respect to acrylic plate, 180° peeling at 80° C.) (N/20 mm) | Resistance Value immediately after stuck (KΩ) | Resistance Value after left at 60° C. and 95% RH for 168 hours (KΩ) | Corrosion Resistance |
| Example 1 | A | 5.9 | 0.59 | 0.57 | good |
| Example 2 | A | 3.7 | 0.57 | 0.59 | good |
| Example 3 | A | 4.1 | 0.55 | 0.58 | good |

TABLE 2-continued

| | | | | | |
|---|---|---|---|---|---|
| Example 4 | A | 4.4 | 0.58 | 0.55 | good |
| Example 5 | A | 3.8 | 0.54 | 0.55 | good |
| Comparative Example 1 | B | 3.4 | 0.58 | 0.53 | good |
| Comparative Example 2 | B | 3.0 | 0.53 | 1.301 | poor |
| Comparative Example 3 | B | 1.8 | 0.54 | 0.54 | good |

As obvious from the results in Table 2, the pressure-sensitive adhesive sheets of the invention (Examples) had a low haze and had excellent outward appearance, after stored (immediately after stored and in 2 hours after stored) in an environment at 60° C. and 95% RH for 120 hours. In addition, the sheets bad high peel adhesion force at 80° C. and had good adhesion reliability at high temperatures. On the other hand, the haze of the pressure-sensitive adhesive sheets of Comparative Examples, after stored in an environment at 60° C. and 95% RH for 120 hours, increased, and the outward appearance thereof was poor. In addition, the peel adhesion force at 80° C. of the comparative sheets was low, and the high-temperature adhesion reliability thereof was low.

While the present invention has been described in detail and with reference to specific embodiments thereof, it will be apparent to one skilled in the art that various changes and modifications can be made therein without departing from the scope thereof.

This application is based on Japanese patent application No. 2009-256249 filed Nov. 9, 2009, the entire contents thereof being hereby incorporated by reference.

What is claimed is:

1. An optical-use pressure-sensitive adhesive sheet, which comprises an acrylic pressure-sensitive adhesive layer containing an acrylic polymer formed of one or more monomer ingredients containing, as an indispensable monomer ingredient, a monomer of which homopolymer has a glass transition temperature of not lower than −10° C. in an amount of 5 to 60% by weight, a carboxyl group-having monomer in an amount of at most 0.5% by weight, a hydrophilic monomer, which contains N-vinyl-2-pyrrolidone and a hydroxylalkyl (meth)acrylate, in an amount of from 3 to 70% by weight relative to the total (100% by weight) of the entire monomer ingredients for forming the acrylic polymer, and at least a linear or branched alkyl group-having alkyl (meth)acrylate where the alkyl group has from 6 to 10 carbons or alkoxyalkyl (meth)acrylate in an amount of 50% by weight or more relative to the total (100% by weight) of the entire monomer ingredients for forming the acrylic polymer, wherein said sheet having a moisture content of at least 0.65% by weight after stored in an environment at 60° C. and 95% RH for 120 hours.

2. The optical-use pressure-sensitive adhesive sheet according to claim 1, which has a whole light transmittance of at least 87% and a haze of at most 3.0%.

3. The optical-use pressure-sensitive adhesive sheet according to claim 1, which has a whole light transmittance of at least 87% and a haze of at most 3.5% after stored in an environment at 60° C. and 95% RH for 120 hours.

4. An optical member comprising the optical-use pressure-sensitive adhesive sheet according to claim 1.

5. A touch panel comprising the optical-use pressure-sensitive adhesive sheet according to claim 1.

6. An image display device comprising the optical-use pressure-sensitive adhesive sheet according to claim 1.

7. An optical-use pressure-sensitive adhesive sheet comprising an acrylic pressure-sensitive adhesive layer containing an acrylic polymer formed of one or more monomer ingredients containing, as an indispensable monomer ingredient, a monomer of which homopolymer has a glass transition temperature of not lower than −10° C. in an amount of 5 to 60% by weight, a carboxyl group-having monomer in an amount of at most 0.5% by weight, a hydrophilic monomer, which contains N-vinyl-2-pyrrolidone and a hydroxylalkyl (meth)acrylate, in an amount of from 3 to 70% by weight relative to the total (100% by weight) of the entire monomer ingredients for forming the acrylic polymer, and at least a linear or branched alkyl group-having alkyl (meth)acrylate where the alkyl group has from 6 to 10 carbons or alkoxyalkyl (meth)acrylate in an amount of 50% by weight or more relative to the total (100% by weight) of the entire monomer ingredients for forming the acrylic polymer, and wherein the sheet does not get cloudy after stored in an environment at 60° C. and 95% RH for 120 hours.

* * * * *